Patented Feb. 16, 1943

2,310,935

UNITED STATES PATENT OFFICE 2,310,935

RESINOUS COMPOSITION

Richard Paul Carlton and Byron J. Oakes, St. Paul, Minn., assignors to Minnesota Mining & Manufacturing Company, St. Paul, Minn., a corporation of Delaware No Drawing. Application January 29, 1941, Serial No. 376,422

9 Claims. (Cl. 260—20)

This application is a continuation-in-part of our application Serial No. 708,662, filed January 27, 1934, which latter is a continuation-in-part of our application Serial No. 660,319, filed March 10, 1933.

Though much of the description herein illustrates the invention particularly in its relation to coated abrasive articles or so-called "sandpaper," yet resinous compositions disclosed as having special utility in such relation are, moreover, novel and advantageous per se, and are defined in the appended claims.

Of the resinous compositions herein disclosed, special attention is directed, for example, to certain oil-soluble phenol-aldehyde resins herein described and illustrated, and especially to that specific aspect of the present invention involving modified phenol-aldehyde resins, e. g. phenol-aldehyde, alkyd resin compositions. Such compositions may in certain cases be regarded as modified alkyd resins. A particularly advantageous illustrative resinous composition is produced by homogenizing, at elevated temperatures, the desired ingredients, e. g. (1) an oil-soluble phenol-aldehyde resin, (2) a vegetable drying oil such as China-wood oil (i. e. a conjugate double bond compound) or linseed oil, and (3) an alkyd resin comprising an interaction product of such ingredients as glycerine, phthalic anhydride and a drying oil or drying oil acid. A homogeneous or substantially uniform new product is formed when an oil-soluble phenol-aldehyde resin, preferably first cooked with a reactive agent such as a drying oil, has added thereto and admixed therewith, while the resinous mass is at a temperature level of the order of 225° to 250° C., an oil-soluble or air-drying type of alkyd resin, in the manner hereinafter illustrated.

The text of this specification, which now follows, is largely verbatim that of our said application Serial No. 708,662.

Our present invention relates in general to the treatment of material preferably in sheet form, and more particularly the treatment of material for purposes of forming or attaining composite structures of which well-known forms of abrasives, as what is commonly known as sandpaper, is an example.

In the patents known to us for the production of such articles, of which Patent No. 1,565,028, granted December 8, 1925; No. 1,581,657, granted April 20, 1926, and Reissue No. 17,593, February 11, 1930, all in the name of Frances G. Okie, are examples, a stable waterproof and flexible abrasive article in the nature of sandpaper and the process of manufacturing the same is described.

Such treatment and resulting product, though satisfactory, entails considerable expense, by reason of the time consumed and the time the necessary equipment is in use for producing such articles on a large commercial basi.

Where a vehicle or volatile solvent for the waterproofing ingredients is used, for the production of a proper final product the process entails consideration of homogeneity of the preliminary composition in the vehicle or solvent; rapidity of separation of the vehicle or solvent; homogeneity of the composition during various stages of separation of the vehicle or thinner; rapidity of setting or drying to enable speedy and economical handling and production of the article.

It is therefore an object of our invention to provide an abrasive article comprising primarily, a flexible backing material in the nature of a felted fabric, such as paper, or a woven fabric, such as cloth, as the base for a grit or layer of abrasive particles, and including a binder with or without sizing coats of a material that is waterproof, stable, and results in a final article which is flexible and resists the action of fluids used in abrading operations, and of a character to maintain the bonding effect of the abrasive article effective in dry or wet abrading operations throughout the effective abrading life of the abrasive article, and which effects considerable economy in the production and cost of the article, by reason of the speed with which the article may be produced. It is contemplated by our invention to provide an abrasive article in the nature of sandpaper, including as a component thereof, either as a binder, sizing coat, back coat or grit-sizing coat, a stable, flexible and waterproof material which acts more efficiently than such components as previously known to us, so far as inertness, waterproofness, flexibility and efficiency in abrading operations are concerned, and which entails considerable economy in labor and cost of production.

It is further contemplated as an object of our invention to provide stable, flexible and waterproof materials and methods of their production, for purposes particularly valuable in the production of abrasive articles in the nature of sandpaper, wherein products characterized by inertness in the presence of liquids used in abrading operations, together with waterproofness and flexibility, are obtained. A further object is to produce a new resinous composition (e. g. a modified phenolic resin or a phenol-aldehyde, alkyd complex) which is more flexible and/or has better adhesion than phenol-aldehyde resins heretofore known. It is also an object to produce a resin which is more waterproof and/or more resistant to penetration than alkyd resins heretofore known. Other objects and advantages will appear from the invention as a whole.

In the practice of our invention, we have found that the resinous component of the binder material may be substituted in whole or in part by a phenol-aldehyde condensation resin, such as phenol-formaldehyde resin, and that, as a result of such substitution the time required for the setting or hardening of the binder is materially reduced, thus permitting greater speeds of production. And in addition to this highly desirable economy of time we are able to improve the quality of the end product by the said substitution.

Furthermore, we have found that by proper selection and treatment of the fatty-oil and phenol-formaldehyde resin we are able to induce a reaction and/or polymerization involving said ingredients, thereby obtaining a resinous material differing substantially from all similar materials known to us and possessing properties particularly desirable for our purpose.

In a convenient form, the fatty-oil is preferably China-wood oil and the resin constituent is a phenol-formaldehyde resin of the Bakelite type which is acetone and oil-soluble and potentially reactive with fatty-oils. The China-wood oil and the phenol-aldehyde resin are preliminarily treated to induce polymerization. This is accomplished by melting the resin in the fatty-oil while the oil is receiving its heat treatment. The reaction and/or polymerization of the phenol-formaldehyde and the fatty-oil occurs at approximately 235° C.; and when natural resins or the glyptal type of resins are to be incorporated into the bond in addition to the phenol-aldehyde resin, the second resin is preferably added after the aforementioned reaction has been carried to completion. We have found that the presence of a natural resin retards the reaction to the degree that it is present within the limits of reacting resin to combine with an acidic oil or resinous material, and under certain conditions, may, if not totally, partially inhibit the reaction between the oil and the reactive phenol-aldehyde resin, if present. Driers do not appear to influence this reaction. However, we find it convenient to add some drier after the heat treatment in order to accelerate the drying or hardening of any excess of the fatty-oil which does not enter into direct combination with the phenol-aldehyde resin. The driers may be of the type referred to in the prior Okie U. S. patent; other driers such as the metallic resinates, particularly manganese resinate and/or tungate may be used.

The oil-resin compound so prepared may have added thereto a suitable thinner in quantities dependent upon the use to be made of it, either for the binder coat or sizing coat, or dependent upon the condition of the backing material which may or may not have been previously waterproofed. By selecting the proper thinner or mixture of thinners, and by controlling the amount added to the oil-resin compound we are able to obtain any desired degree of penetration into the backing material from complete saturation to a surface coating or film of sufficient thickness to act as the binder coat for the grit or layer of abrasive particles. Thus we may add between 10 and 50% of thinner to the oil-resin compound described above.

The polymerized resin-oil and thinner composition may be used to saturate a backing material, surface coat the same, where the inherent flexibility of the backing material is desired retained, or be added to a previously treated paper to leave a substantial residuum serving as a binder coat for the grit or layer of abrasive particles. In use with higher percentages of thinner, the composition is preferably used for the grit-sizing, in accordance with the process outlined in the Okie U. S. patents previously described.

A convenient formula for our purposes is as follows:

| | Percent |
|---|---|
| China-wood oil | About 62.5 |
| Phenolic-aldehyde resin | About 25.0 |
| Driers | About .5 |
| Thinners | About 12.0 |

The percentages above given are by weight.

The thinner preferred by us is a hydrocarbon of the petroleum series, known on the market as oleum spirits, and has a boiling range of 125 to 244 degrees C.; initial boiling point not below 125 degrees C.; not more than 50% over at 171 degrees C.; recovery at least 95%; residue colorless; and point below 244 degrees C. To a certain extent, petroleum spirit of a boiling range between 60 and 120 degrees C., specific gravity .67 to .70 may be used. Also varnish makers' and painters' naphtha may be used. This product has a boiling range of 100 to 160 degrees C.; specific gravity .73. White spirit may also be used, which is a petroleum hydrocarbon having a boiling range of 80% below 190 degrees C.; 90% below 200 degrees C. Lacquerpetro may also be used which is a hydrocarbon solvent of the petroleum series; 85% distilling below 200 degrees C.; 97% distilling below 200 degrees C.

Where the ratio of the resin to the oil is greater than 1-3, either turpentine or solvent naphtha (coal tar solvents) must be used as the major part of the thinners. Where the ratio is 1-3 or less, oleum spirits may be used.

Additionally, the thinner may be a mixture of turpentine and the hydrocarbon solvents above enumerated.

As the resulting oil-resin compound, as contemplated by us and above described, has certain oxidation properties indicating a portion of the drying-oil to retain some of the drying characteristics, the thinner as contemplated by our invention is one which has solvent action upon the oil-resin to retain a homogeneous mixture through all stages of separation of the thinner, in accordance with the further treatment to which the article is submitted in its production.

The composition as prepared by our invention is applied to a backing material, either by surface coating or an impregnation, when a layer serving as the binder coat is applied. The grit or layer of abrasive particles is incorporated in a surface coating upon the backing material, in accordance with processes heretofore devised for incorporating the same upon the web of fabric carrying the adhesive oil-resin composition. This may be accomplished after a layer of the polymerized oil-resin compound has been formed on the backing material, and before the thinner has been fully volatilized.

The backing, now carrying the polymerized oil-resin composition and a grit or layer of abrasive particles, is passed to drying rooms, where the thinner is progressively removed. The drying action is continued in rooms in which the air is well circulated, preferably at elevated temperatures of about 120 to 150 degrees F.

The application of the materials in the web so prepared, forms a film which is dust-free, that is, a film to which dust will not readily adhere, in fifteen minutes and can easily be handled in one hour.

The hydrocarbons above specified are preferred for our purposes in that during substantially the entire period of volatilization of the thinner, the mixture remains homogeneous, without precipitation of any of the components. Though we consider this an important phase of our invention and though we have specified the hydrocarbon solvents above as suitable for our purposes, preferring oleum spirits, it is contemplated by our invention to include within the scope thereof such thinners which serve as a solvent through all concentrations of polymerized oil and resin composition in the solvent, as may be experienced in the treatment of the backing material carrying the polymerized and oxidizable oil-resin composition preferring the modification of solvent in accordance with the variation of the ratio of resin to oil as previously set forth.

The particular features of our invention thus far described, distinguishing from the waterproofing ingredients used in said prior Okie patents, reside in the production of a film which is equally flexible, but of tougher and harder characteristics. The film is substantially resistant to all liquids which may be used in abrading operations, such as water, oils, solutions of detergents and gasoline. The period for setting or drying the final product is materially reduced. As compared with artificial resins, such as phenol-formaldehyde condensation resins of the Bakelite type, our composition is productive of greater speeds of operation and produces a tougher, more flexible product, and for substantially thick binder coats without necessitating rigid backing forms, molds and/or pressure to react the product to its final form, and such reaction to the final stage is accomplished without rigid backing forms, molds, the final setting being attended with no warping or distortion of the fabric carrying the binder.

As a further embodiment of our invention it is contemplated by us to preliminarily heat the drying-oil with the drier, short of forming a solid product and then incorporate the proportion of the phenolic-aldehyde resin, preferably the potentially reactive type, incorporate this mixture with the necessary quantity of thinner and then surface apply this mixture to the backing material, in accordance with the sandpaper making processes previously described. It is preferred under such conditions, to substitute the phenolic-resinous composition for only part of the resinous constituents specified in said Okie patents, and where a non-oil-soluble phenolic resin is used, preferably preliminarily fusing the resinous constituents which may be used with the phenolic-aldehyde resin, before incorporation into the vegetable fatty oil used.

In the embodiment above referred to, we have referred to the use of a phenol-aldehyde condensation resin of the Bakelite type which is acetone and oil-soluble and/or reactive with fatty oils, as the most suitable form of the resin which may be substituted in whole or in part for the resinous constituents in the formulae referred to, of the Okie patents. A still more particular designation of the phenol-aldehyde condensation resin will now be made. In the production of an acetone and oil-soluble resin and one which is reactive with fatty oils, we have obtained successful results with the following procedure:

20 to 30 parts of tung oil are dissolved with 100 parts of a phenol, conveniently cresol. To this is added about 3% of a converting agent, using aluminum chloride, sulphuric acid or hydrochloric acid. These ingredients are reacted to condensation and any aqueous material formed is thereafter separated. The oily layer has then added to it a sufficient quantity of formaldehyde to ordinarily combine with the phenol constituent to form a non-reactive resin. About 65 parts of formaldehyde are usually added. Additionally, after partial reaction sufficient to form a permanently fusible resin, there may be added an additional quantity of formaldehyde, or a material having an active methylene group, such as hexamethylenetetramine to make, under the heat treatment, an oil-reactive resinous material. The resinous material may be substituted in whole or in part in the Okie formulae heretofore referred to and comprising 12 to 39% of resinous materials; fatty oil from 81 to 50%; driers from .5 to 1% and the balance up to 40% of volatile thinner.

In distinguishing our foregoing form of acetone and oil-soluble and/or fatty-oil-reactive-resin which we may use, reference will be made to the resin last described, which is a convenient one for our purposes, as the "phenol-fatty-oil-reactive-resin," which is so termed by clear evidence of reaction, which takes place when this resin is heated with the fatty oil hereinbelow described in the further production of the binder material, as distinguished from mere increase in body of the mixture with other resinous materials, notwithstanding polymerization of the fatty oil itself.

As another embodiment of an acetone and oil-soluble and/or fatty-oil-reactive resin which we may use as the "phenol-fatty-oil-reactive-resin" for purposes of reacting with a fatty oil, in accordance with the prior procedure, the resinous condensation product of oil-soluble characteristics and reactive with oil in accordance with the procedure previously outlined, is a phenolic-aldehyde resin, or a phenolic-resinous condensation product, in which the phenolic constituent is either partially or completely an alkyl substituted phenol. The higher alkyl substituted phenol may be used and para tertiary amyl or butyl phenol are given as examples.

In the preparation of the oil-soluble and/or oil-reactive resinous material, utilizing the alkyl substituted phenol, these ingredients may be substituted for the phenol. Where the reaction is with an aldehyde, it is convenient to react the alkyl substituted phenols and aldehydes in equal mol ratios with the usual condensing agents; see, for example, pages 108, 109 et seq. of the 1923 edition of "Synthetic Resins" by Carleton Ellis, where exemplary alkali and other catalysts are disclosed.

In the further production of the binder material of the waterproofing composition, for our purposes, the "phenol-fatty-oil-reactive-resin" just described is mixed with the proportion of fatty oil and drier, and heated in accordance with the process heretofore described, at a temperature of about 225 to 250 degrees C. Thereafter, the percentage of thinner is added.

While we have referred to substitution in whole or in part of the phenol-aldehyde resin for the resinous component in the formulae outlined and included by the Okie patents, where we use the resinous material hereinbefore referred to as the "phenol-fatty-oil-reactive-resin," it is preferred by us to have this resinous constituent entirely replace the resinous constituent of the Okie formulae previously referred to. In making such complete substitution for the resinous material and after reaction as described and formation of the oil-resin complex in the volatile thinner, the solution of the polymerized oil and "phenol-fatty-oil-reactive-resin" may be used for the "making" coat, binder coat or sizing coat in the production of a tough and flexible abrasive article, with greater speed of production than heretofore known, and where this complex of polymerized oil and "phenol-fatty-oil-reactive resin" is used, the product not only retains a homogeneous mixture through all stages of separation of the thinner, but also, forced drying of high order may be practiced, without fear of segregation of any portion of the resinous constituents. After elimination of the thinner, the web and coating or coatings thus formed are submitted to air-drying action, preferably at elevated temperatures of 120 to 180 degrees F., as heretofore described.

The "phenol-fatty-oil-reactive-resin" and oil will react in all proportions of resin to oil, and hardness of the finally reacted mixture may be increased with the increase of the "phenol-fatty-oil-reactive-resin." The increase in hardness is more abrupt up to the point of three parts of oil to one part of resin. As the proportion of resin to oil is increased beyond this point, the increase in hardness is more gradual. At approximately the ratio of three parts of oil to one part of resin, the reacted mass shows substantially greater toughness and greater hardness than the same quantity of resin in an unreacted form. This serves not only as a basis for evidence of reaction of the resin and the oil, but also as a guide to alteration of the properties of the final product with the variations of the ratio of oil to resin.

In the convenient practice immediately above referred to, wherein the "phenol-fatty-oil-reactive-resin" is completely substituted for the resinous constituents of the Okie formulae, thereby completely eliminating the natural resins, any tendency towards segregation of the resinous materials is completely avoided in all stages of separation of the volatile thinner or relative speeds of separation of said thinner, resulting in an exceedingly homogeneous end product of ascertainable uniformity without the retention of considerable saponifiable constituents, and therefore rendering the product more adhesive in the presence of abrasive particles, and in general, giving a product of greater waterproofness; greater hardness to resist displacement of such particles, or penetration of the binder by abraded particles, and greater toughness to permit higher speed abrading operations.

As hereinabove pointed out, a convenient form of our binder or adhesive material may comprise substantially two and one-half to three parts of China-wood oil to one part of "phenol-fatty-oil-reactive-resin." This substance is highly waterproof and forms a very strong, tough bond of good flexibility and a fair degree of stretch.

For some purposes we have found the stress of stretch or distensibility of this binder to be somewhat too great, particularly where paper is used as a backing material in an abrasive article which is used in water abrading operations.

The stress of stretch or distensibility of the binder coat being greater than that of the moist paper backing may cause the latter to develop cracks while the abrasive article is in use, thus putting the entire stress of the abrasive operation on the binding coating, and thus reduce the useful life of the abrasive article.

We have found that this difficulty may be overcome by adding a quantity of glyptal type of resin to the resin-fatty-oil compound hereinbefore described. While some of the glyptal resins are not without some modification, as desirable for our purposes as others herein particularly described, we have found that any glyptal resin which is miscible with fatty oils or oil varnishes, and particularly those which include the fatty acids of drying-oils or semi-drying oils, obtains the desirable results when used in the proper proportions. Forms of the glyptal resins referr to and which may be characterized as artificial resins of the condensed ester type of polyhydric alcohols and resinifying carboxylic organic acids or their anhydrides which are preferred for our purposes, may be produced as follows:

*Example A*

92 parts (by weight) of glycerine are heated with 148 parts of phthalic anhydride until the evolution of gas decreases slightly, then 141 parts of vegetable fatty acids (such as the fatty acid of linseed oil) are added together with 37 parts of phthalic anhydride. This composition is then heated to 210 degrees centigrade for a time and finally to 225 degrees centigrade until the evolution of gas decreases.

In the above cited example of a glyptal type resin, especially one which is miscible with, or can be blended with, fatty oils, such as that contemplated by us in making a "phenol-fatty-oil-reactive-resin," and oil complex, the resins or resinous compositions, such as that made in accordance with the application of Guth, Serial No. 347,159 entitled Flexible sheet abrasive and method of making the same, and assigned to the Minnesota Mining and Manufacturing Company, may be utilized by us in accordance with the present invention. Thus, the glyptal resin may be made from polyhydric compounds of the character disclosed in said application, together with aromatic or cyclic polybasic acids, and though the phthalic anhydride may be used as a single aromatic acid, this may be substituted in whole or combined with an aliphatic acid, such as oleic, butyric, succinic, citric, also benzoic, maleic, glutaric, suberic, camphoric, adipic, linelic eleostearic, lineoleic, linolenic. The acids above listed derived from drying-oils are preferred by us and the lineleic, linelic, linolenic, and eleostearic acids of the group enumerated are characteristic of acids derived from drying oils, which are so preferred.

Where still greater flexibility is desired, suberic and adipic acids may be included as the resinifying carboxylic, organic acids, in addition to the drying-oil fatty acid above enumerated, and as partial or entire replacement for the phthalic anhydride in the example above given.

As a variation for the production of an oil miscible or oil-soluble glyptal type resin, the following may be given:

Example B 92 parts of glycerine
296 parts of phthalic anhydride. These ingredients are heated to 160 degrees C., after which there is added
74 parts of phthalic anhydride and
140 parts of a fatty acid derived from a drying-oil, such as China-wood oil, linseed oil, perilla oil. These constituents are heated from 190–210 degrees C. until evolution of the gas decreases and resinification has been effected.

As a variation in the production of an oil-soluble glyptal type resin, which is compatible to the oil contemplated in accordance with our invention, as well as to the "phenol-fatty-oil-reactive-resin," for the purposes above enumerated in connection with forming the binder coat, or for a separate and distinct coat compatible with the "phenol-fatty-oil-reactive-resin" China-wood oil binder coat, the following example may be given:

Example C 370 parts of phthalic anhydride;
140 parts of drying-oil fatty acid. These are heated to 160 degrees C. Thereupon
92 parts of glycerine are added and heated to 200 degrees C., to resinification.

Another example of glyptal type of resin which we have found valuable for reducing the stress of stretch of the binder as described, particularly where paper is used as a backing material for an abrasive article, as an admixture with the "fatty-oil-reactive-resin" and fatty-oil compound, or as a separate compatible coating forming the sizing for the paper backing or as a sand-size for the grit bonded coating, a complex or blend of a glyptal resin and China-wood oil may be prepared as follows:

Example D

A glycerol phthalic anhydride resin and China-wood oil in the proportions of equal parts of the resin and oil are dispersed in a high boiling solvent, such as benzyl benzoate. The mixture is heated to 100–110 degrees C. until the China-wood oil thickens and then heating is continued at 200 degrees C. until the glyptal resin and China-wood oil become dispersed or form a complete blend. The solvent is removed by precipitating the resin in a non-solvent for the resin. In this example, other oils than China-wood oil may be used, such as linseed oil, perilla oil, soya bean oil, castor oil, cotton seed oil. Other high boiling dispersing agents may be used and the glyptal resin may be used in its initial resinified stage.

We may also use an artificial resin complex of the condensed ester type and phenol-aldehyde type, in which drying-oil acids are included in accordance with the procedure outlined in the Guth application aforementioned, and these may be made by a multi-stage process or a single stage process, but phenol-aldehyde resins of the type herein illustrated are preferred and it is also desired to combine the condensed ester or alkyd with the phenol-aldehyde under superatmospheric temperatures, e. g. in the manner hereinafter illustrated.

Glycerol phthalic anhydride resin may be rendered compatible for the purposes contemplated by us by procedure avoiding the use of dispersing agents, by a procedure which involves heating a mixture of drying-oil and resin in the presence of a high-boiling solvent. At a temperature of about 200 degrees C. the materials are thoroughly dispersed in the solvent. It may then be mixed with a glycerol phthalic anhydride resin without the use of a dispersing agent and in this form may be used as an addition to the "phenol-fatty-oil-reactive-resin" and fatty-oil compound for reducing the stress of stretch and for the purposes contemplated by us as previously described, in forming a coating compatible with the "phenol-fatty-oil-reactive-resin" and fatty-oil compound which may be used.

As an additional example of a phenol-aldehyde glyptal type of resin which may be made for the purposes contemplated by us, the following example may be given:

Example E

A phenol, preferably cresylic acid and an aldehyde, preferably paraldehyde, in equal molecular proportions, are heated until a primary condensation is obtained. After purification to remove the unreacted cresol, there is added
45 parts of phthalic anhydride;
22 parts of glycerol;
23 parts of linseed oil acids. These ingredients are heated in an inert atmosphere at 250 degrees C.

All of the ingredients aforementioned may be formed into a resinous mass in a single stage, in accordance with the procedure outlined in the said Guth application, relating to resin formed with phthalic anhydride, glycerol, furfural and cresol, together with the fatty-oil fatty acid, particularly, the fatty acids of the drying-oil type. In the example above given, for cresylic acid and paraldehyde, the phenol type resin may include phenol-aldehyde, cresol-furfural, phenol-ketone types of resins or resin forming ingredients.

As an additional form of oil-soluble resin of the glyptal type, which may be used in association with the fatty-oil-reactive-resin and fatty-oil compound for the purposes indicated, this may be one resulting from forming a phenol type of resin in the presence of a natural esterifiable resin, the natural resin being esterified and the glyptal type resin being formed in the presence of the phenol resin esterified natural resin mixture. The following procedure may be employed:

Example F 250 parts of rosin;
25 parts of cresol, are melted with
8 parts of paraformaldehyde. These ingredients are fluxed successively at 100–125 degrees C. and 220 to 250 degrees C.

25 parts of an esterifying ingredient, such as glycerine, is added and heated to cause esterification by heating to 275 degrees C. Additional quantities of a polybasic acid, such as phthalic anhydride and glycerine are added and then heated, preferably in an atmosphere of carbon dioxide, at 200 to 240 degrees C. to form the glyptal type resin in the presence of the phenol resin esterified natural resin mixture.

As a still further example for the production of a compatible resin having glyptal resin characteristics, for the purposes contemplated by us, the following additional example may be given:

Example G

Phthalic anhydride is reacted with an excess of glycerine until the evolution of the water vapor ceases. Thereupon, there is added a quantity of drying-oil fatty acid, such as linseed oil fatty acid, to react with the excess glycerine and the mixture heated until the desired consistency is obtained. The resulting resin may be further reacted with a phenol type of resin, which is oil-soluble, which promotes the solubility of the mixture.

As a still further embodiment for the production of an alkyd or glyptal type of resin, compatible for the purposes hereinbefore described, the following additional example may be given:

*Example H*

180 parts of glycerine;
280 parts of drying-oil acid.

The above ingredients are heated to a temperature of 200 degrees C. for approximately one hour. To the mass so heated, there is added:

290 parts of phthalic anhydride, during reaction of the previous reacted ingredient, the temperature being maintained at 200 to 220 degrees C. for a further period of approximately two hours. The resin so formed will be oil-compatible.

As noted, reaction is first accomplished between the polyhydric alcohol and the drying-oil acid, before the addition of the acid which may be phthalic anhydride or the polybasic or aromatic acid.

Where glycerol is specified, other polyhydric alcohols may be used, such as glycol, diethylene glycol and similar polyhydric alcohols.

A still further example of an oil-compatible alkyd or glyptal type resin may be made as follows:

*Example I*

70 parts phthalic anhydride;
44 parts linseed oil acid or other drying-oil acids;
35 parts glycerine;
40 parts coumarone resin.

The above ingredients are heated at a temperature of 250 degrees C. for approximately two and a half hours, after the temperature stated has been attained.

The foregoing procedure may be varied to the extent that after forming the resin from the phthalic anhydride, glycerine and drying-oil fatty acid, as described, the oil-soluble phenol type of resin that may be used is that which is hereinabove described as the "phenol-fatty-oil-reactive-resin."

In the examples enumerated under A to G, though we have described artificial resins of the condensed ester type, which include in addition to the polyhydric alcohols, resinifying carboxylic organic acids or their anhydrides, preferring such resinifying carboxylic organic acids, in certain instances, such acids may be replaced, in whole or in part, by a synthetic resin carboxylic acid obtained by causing chloracetic acid to react with the initial condensation product of phenol and formaldehyde.

For the purposes of simplifying the designation of the foregoing resinous mixtures, as enumerated under Examples A to I and the variations in procedure outlined thereunder, reference will be made to these compositions as "oil-compatible glyptal resins."

We have previously stated that the addition of the "oil-compatible glyptal resin" to the "phenol-fatty-oil-reactive-resin" and fatty-oil compound is exceedingly desirable, particularly in connection with the use of the binder for coating a backing material of paper in the formation of an abrasive article, and while we are not prepared to state exactly the physical or chemical function which the "oil-compatible glyptal resin" performs in our composition, such addition, in effect, reduces the stress of stretch and renders the binder more retentive of its flexibility. We obtain the desired degree of stretch and flexibility in the finished binder by adding an oil-compatible glyptal resin to an extent of approximately 3 to 35%, preferably approximately 10% of the "phenol-fatty-oil-reactive-resin" and fatty-oil compound.

While we may blend the "oil-compatible glyptal resin" with the "phenol-fatty-oil-reactive-resin" or the China-wood oil compound, or the mixture of the "phenol-fatty-oil-reactive-resin" and China-wood oil compound, before polymerizing the "phenol-fatty-oil-reactive-resin" and China-wood oil compound, we prefer to first polymerize the "phenol-fatty-oil-reactive-resin" and China-wood oil to obtain the reaction or polymerization at the temperature of about 225 to 250 degrees C., and after reaction or polymerization and while the temperature is still approximately 235 degrees C., the "oil-compatible glyptal resin" is added. Thereafter the mass is permitted to cool and the necessary thinner is added. The "oil-compatible glyptal resins" particularly those enumerated under Examples A to G, which include a phenolic constituent, may serve completely to displace the "phenol-fatty-oil-reactive-resin" hereinbefore specifically described, in which embodiment the "oil-compatible glyptal resin" and the China-wood oil or similar drying-oil is reacted or polymerized, preferably in conjunction with an agent to induce polymerization or reaction. Such complex of "oil-compatible glyptal resin" and oil, when polymerized, in accordance with this procedure, provides a product which, though including the fatty-oil in percentages of 50–81% of the total mass, produces a film which dries rapidly.

The binder compound described above, which includes the "fatty-oil-reactive-resin," drying-oil and "oil-compatible glyptal resin," is particularly suitable as a coating for the lighter grades of paper, for example those running from 40 to 50 pounds per ream, when this paper is used as a backing material in the preparation of sandpaper.

What we claim is:

1. As a new composition of matter, a resinous composition comprising an intimate heat reaction product on an oil-soluble alkyd resin with a phenolic resin material produced by cooking together an oil-soluble phenol-formaldehyde resin with a drying oil.

2. As a new composition of matter, the hardened, uniform, substantially homogeneous product resulting from combining and reacting at superatmospheric temperatures an intimate intermixture of an oil-compatible alkyd resin with a phenolic resin material produced by cooking together an oil-soluble phenol formaldehyde resin with a drying oil, said alkyd resin making up from three (3) to thirty-five (35) percent of the combined weight of said phenol-aldehyde and drying oil.

3. As a new composition of matter, the hardened, homogeneous resin product comprising an intimate intermixture of an oil-soluble alkyd resin with a phenolic resin material, produced by cooking together an oil-soluble phenol-formaldehyde resin with a drying oil and, while the mass is still hot, mixing said alkyd resin therewith and allowing the whole to cool, said drying oil being employed in excess of said phenol-aldehyde resin.

4. As a new composition of matter, the hardened, uniform, substantially homogeneous product resulting from combining and reacting at superatmospheric temperatures an intimate intermixture of an oil-compatible alkyd resin with a phenolic resin material produced by cooking together an oil-soluble phenol-formaldehyde resin with a drying oil, said alkyd resin making up from three (3) to thirty-five (35) percent of the combined weight of said phenol-aldehyde and drying oil and said drying oil being employed to the extent of approximately two and one-half (2½) to three (3) parts thereof to one (1) part of the said oil-soluble phenol-aldehyde resin.

5. As a new composition of matter, a water-resisting resinous composition which is the hardened, uniform product resulting from combining and reacting at superatmospheric temperatures an intimate admixture of the heat reaction product of a drying oil and an oil-soluble phenol-formaldehyde resin with a lesser but substantial proportion of a drying-oil-modified alkyd resin.

6. As a new composition of matter, a hardened, homogeneous, water-resisting resinous product produced by cooking together an oil-soluble phenol-formaldehyde resin with a drying oil and, while the mass is still hot, mixing uniformly thereinto an oil-compatible alkyd resin and allowing the whole to cool, said alkyd resin being introduced to the extent of at least ten (10) percent of the said phenol-aldehyde and drying oil combined and said drying oil being employed in excess of said phenol-aldehyde resin but not to a greater extent than approximately three (3) parts of said drying oil to one (1) part of the said oil-soluble phenol-aldehyde resin.

7. As a new composition of matter, a hardened, homogeneous, water-resisting resinous product produced by cooking together an oil-soluble phenol-formaldehyde resin with a drying oil at a temperature of about 225°–250° C. and, after reaction of said phenol-aldehyde resin and said drying oil and while the mass is still at a temperature of approximately 235° C., mixing uniformly thereinto an oil-compatible alkyd resin and allowing the whole gradually to cool, said alkyd resin being introduced to the extent of approximately ten (10) per cent of the said phenol-aldehyde and drying oil combined and said drying oil being employed in excess of said phenol-aldehyde resin but not to a greater extent than approximately three (3) parts of said drying oil to one (1) part of the said oil-soluble phenol-aldehyde resin, the aforesaid oil-soluble phenol-aldehyde resin being the reaction product of formaldehyde with a para substituted phenol.

8. As a new composition of matter, a hardened, homogeneous resinous product produced by combining and reacting at substantial superatmospheric temperatures an intimate admixture of an oil-modified alkyd resin with the heat reaction product of a drying oil and an oil-soluble phenol-formaldehyde resin, the phenol-formaldehyde portion of said reaction product being present in lesser but substantial proportion in relation to said alkyd resin.

9. A new composition of matter as defined in claim 2 further characterized in that the phenol-formaldehyde resin is employed to the extent of 25 to 28.5 parts, the said alkyd resin being employed to the extent of 3 to 35 parts.

RICHARD PAUL CARLTON.
BYRON J. OAKES.